(12) United States Patent
Kalluri

(10) Patent No.: US 6,865,374 B2
(45) Date of Patent: Mar. 8, 2005

(54) VIDEO RECOVERY SYSTEM AND METHOD

(75) Inventor: Rama M. Kalluri, White Plains, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 554 days.

(21) Appl. No.: 09/954,651

(22) Filed: Sep. 18, 2001

(65) Prior Publication Data

US 2003/0054769 A1 Mar. 20, 2003

(51) Int. Cl.⁷ .............................................. H04B 15/00
(52) U.S. Cl. ...................... 455/65; 455/525; 455/556.1; 348/14.15
(58) Field of Search ..................... 455/65, 525, 556.1, 455/556.2, 557, 550.1; 348/14.01–14.08, 14.15; 375/240.12, 240.03, 240.21; 382/236

(56) References Cited

U.S. PATENT DOCUMENTS 5,528,284 A * 6/1996 Iwami et al. ............ 348/14.15

FOREIGN PATENT DOCUMENTS

| EP | 0763944 A2 | 8/1996 | ............ H04N/7/50 |
| WO | WO 0106791 | 4/2000 | ............ H04N/7/24 |

OTHER PUBLICATIONS

J. Meggers et al; "A New Feedback Error Control Scheme for Block Based Video Communication in Packet Switched Wireless Networks", Computers and Communications, 1999. Proceedings. IEEE International Symposium on Red Sea, Egypt Jul. 6–8, 1999, Los Alamitos, CA, pp. 324–330, XP010344132.

J. Hartung et al; "A Real–Time Scalable Software Video Codec for Collaborative Applications Over Packet Networks", Proceedings of the ACM Multimedia 98, MM'98 Bristol, Sep. 12–16, 1998, ACM Intern. Multimedia Conf. NY, vol. Conf. 6, pp. 419–426, XP000977531.

E. Steinbach et al; "Standard Compatible Extension of H. 263 for Robust Video Transmission on Mobile Environments", IEEE Transactons on Circuits and Systems for Video Technology, NY vol. 7, No. 6 Dec. 1, 1997, pp. 872–881, XP000199011.

J.T. Wang et al; "Error–Propagation Prevention Technique for Real–Time Video Transmission Over ATM Networks", IEEE Transactions on Circuits and Systems for Video Technology, IEEE Inc. NY, vol. 9, No. 3 Apr. 3, 1999, pp. 513–523, XP000824575.

\* cited by examiner

Primary Examiner—Melur Ramakrishnaiah
(74) Attorney, Agent, or Firm—Michael E. Belk

(57) ABSTRACT

A recover system and method for a wireless video communication system. The system comprises: a transmitter for transmitting encoded video data to a wireless device; a receiver for receiving a return signal from the wireless device; a signal analysis system for analyzing the return signal to determine if a degraded signal condition exists between the transmitter and wireless device; and a recovery system that converts a predictive video frame in the encoded video data into an intra-coded video frame if the degraded signal condition exists.

23 Claims, 2 Drawing Sheets

VIDEO RECOVERY SYSTEM AND METHOD

BACKGROUND OF THE INVENTION

1. Technical Field

The present invention relates generally to the electronic communication of encoded video data, and more particularly to a system and method of recovering video data between wireless devices.

2. Related Art

As the demand for devices that utilize wireless video applications (e.g., video phones, cellular devices, personal digital assistants, etc.) intensifies, the need to provide systems that can effectively communicate encoded video data has become increasingly important. In wireless and other volatile communication systems where transmission errors regularly occur, data loss is an unavoidable problem. For example, in mobile applications involving cellular devices, a fading condition may occur when the receiver is temporarily located in a position where mountains or other geographic features interfere with signal reception. In other cases, an unforeseen event, such as an airplane passing overhead, may interfere and degrade the signal.

Often, such communication errors are severe enough to cause many bits of data to be lost (referred to as "burst bit errors"). These errors may result in one or more frames of video data being lost. Unfortunately, in typical encoded video applications, such errors may not only cause the receiving device to miss the lost frame, but may also result in the loss of subsequent frames of video data, even if the subsequent frames were received intact.

For instance, in encoding schemes such as MPEG-2 video applications, video frames are encoded using interdependencies among the frames. Accordingly, if a predictive frame (e.g., a P frame) is lost, any subsequent frame that is directly or indirectly dependent on that lost frame cannot be decoded, and therefore would also be lost. Thus, if a P frame is lost during transmission to the receiver, all subsequent P frames received up to the next I frame will not be decodable. Given the fact that P frames typically occur in chains, a high likelihood for losing multiple P frames exists. Depending on the length of the chain of P frames, the amount of lost video frame data could be quite extensive.

Given the high likelihood of errors being introduced into wireless (and other volatile) communication channels, along with the interdependent nature of encoded video frames, a need exists for a system and method that can efficiently recover lost video data.

SUMMARY OF THE INVENTION

The present invention addresses the above-mentioned problems, as well as others, by providing a recovery system that recognizes a degraded signal condition between a base station and a video decoding device and then converts a P frame into an I frame in order to avoid further losses by the video decoding device. In a first aspect, the invention comprises a wireless video communication system, comprising: a transmitter for transmitting encoded video data to a wireless device; a receiver for receiving a return signal from the wireless device; a signal analysis system for analyzing the return signal to determine if a degraded signal condition exists between the transmitter and wireless device; and a recovery system that converts a predictive video frame in the encoded video data into an intra-coded video frame if the degraded signal condition exists.

In a second aspect, the invention provides a program product stored on a recordable medium, which when executed, provides a system for recovering encoded video data being transmitted from a base station to a wireless device, wherein the program product comprises: a system for analyzing a return signal from the wireless device to determine if a degraded signal condition exists between the base station and wireless device; and a system that converts a predictive video frame in the encoded video data into an intra-coded video frame if the degraded signal condition exists.

In a third aspect, the invention provides a method of recovering lost video data in a wireless video communication system, comprising the steps of: transmitting encoded video data from a base station to a wireless device; receiving at the base station a return signal from the wireless device; analyzing the return signal to determine if a degraded signal condition exists between the base station and wireless device; and converting a predictive video frame in the encoded video data into an intra-coded video frame if the degraded signal condition exists.

In a fourth aspect, the invention provides a video recovery system for use when transmitting frames of encoded video from a first device to a second device, the system comprising: a system for determining if a degraded signal condition exists between the first device and the second device; and a system that transmits an intra-coded video frame in place of a video frame having predictive elements if the degraded signal condition exists.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Figure 1:
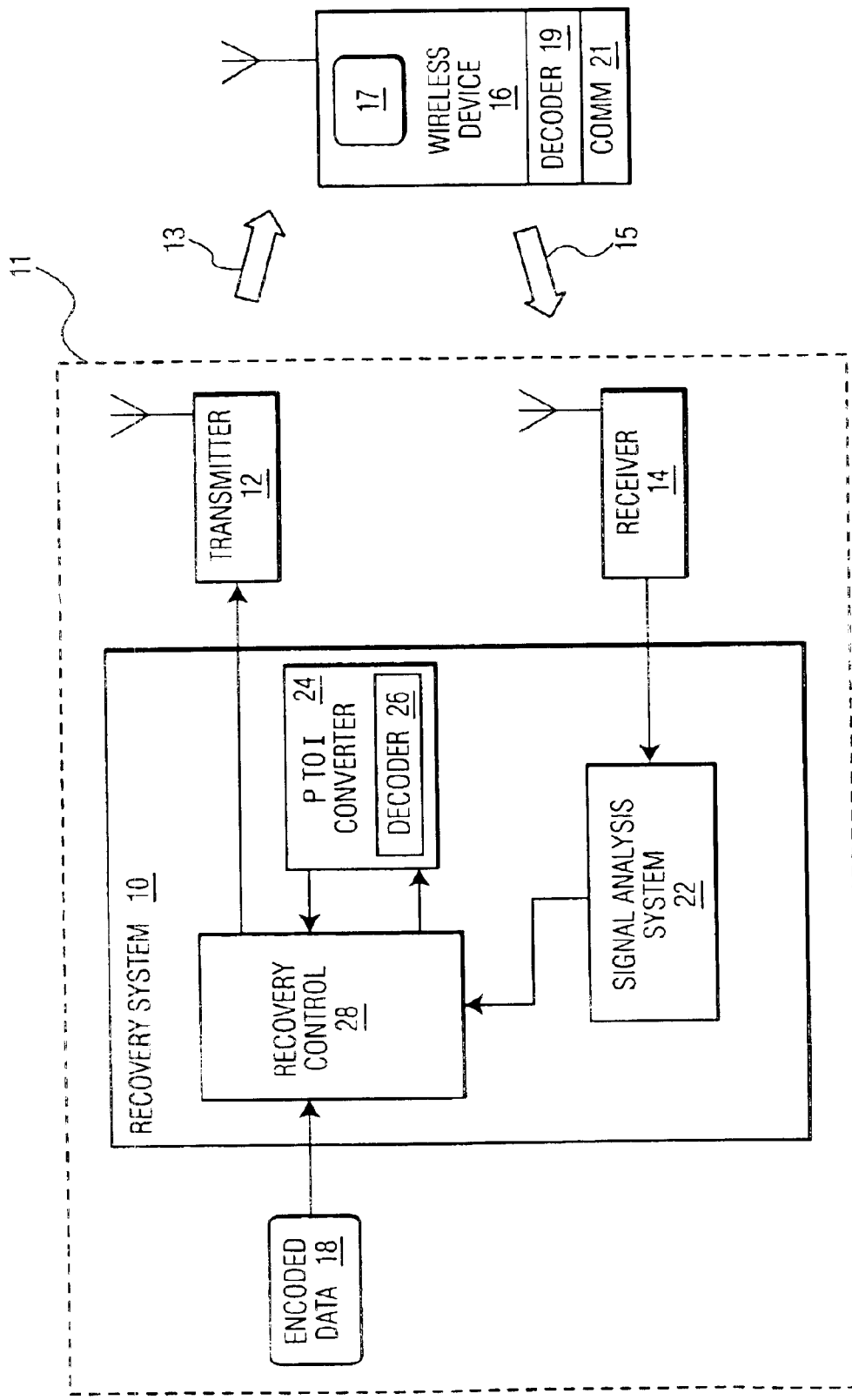
FIG. 1 depicts a video communication system having a recovery system incorporated into a base station.
Figure 2:
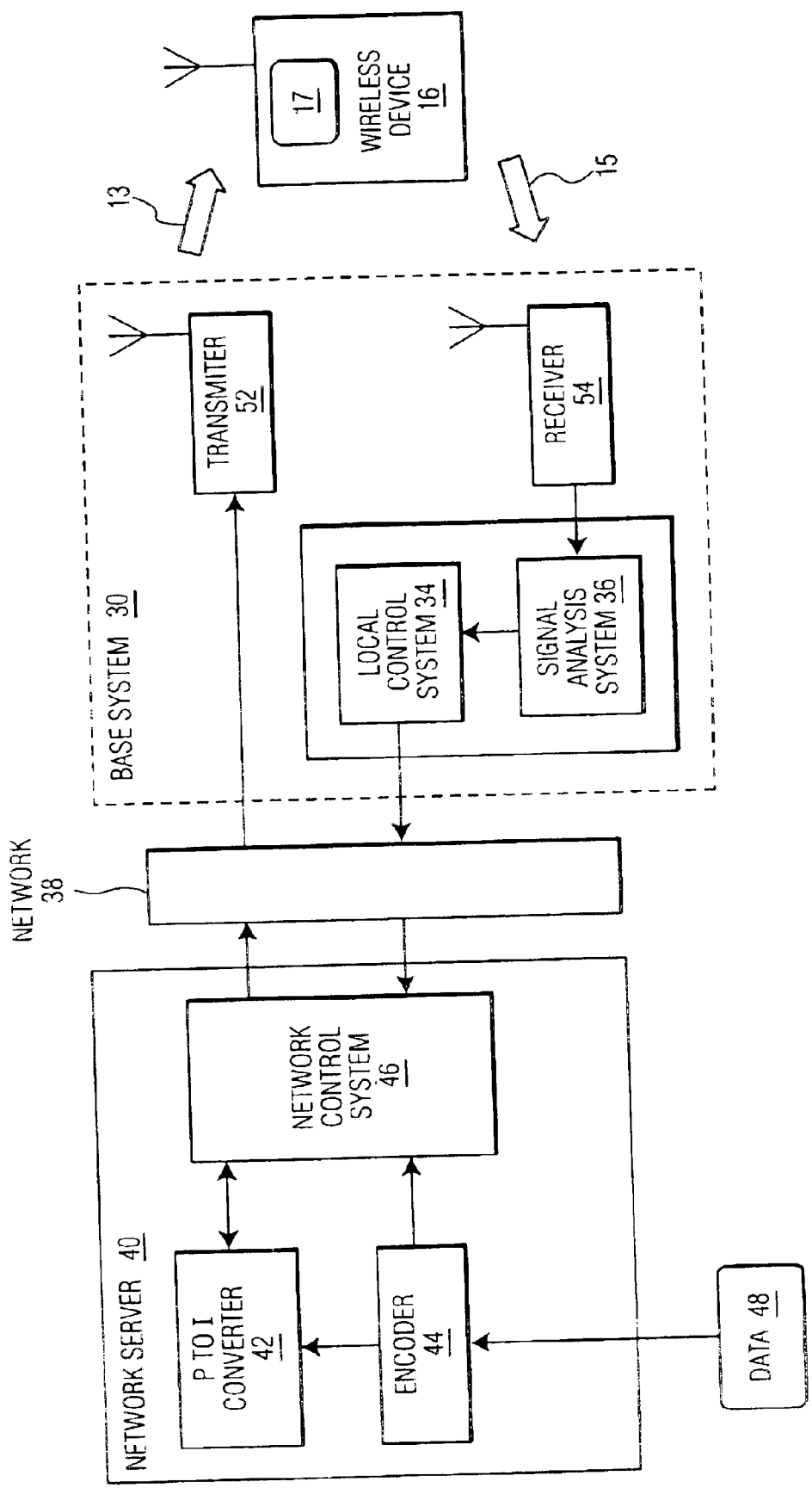
FIG. 2 depicts a video communication system having a recovery system remotely located over a network.

Referring now to the figures, FIGS. 1 and 2 depict two embodiments of a wireless video communication system having data recovery capabilities for encoded video data being transmitted to a wireless device 16. Wireless device 16 may comprise any type of device capable of receiving and displaying encoded video data, such as a videophone, a cellular device, a mobile device, a personal digital assistant, a personal computer, a television, etc. Wireless device 16 includes: a communication system 21 for receiving transmitted video data 13; a decoder 19 for decoding video data; and a display 17 for displaying decoded video data. Transmitted video data 13 may comprise any type of encoded video data (e.g., MPEG-2, MPEG-4, H.261, etc.) that utilize predictive video frames. It should be understood that while the preferred embodiments are described with reference to a wireless communication system, the present invention is applicable to any type of communication system that communicates encoded data over a volatile communication network (e.g., the internet).

Referring to FIG. 1, a first embodiment of a wireless video communication system is shown having a base station 11 that includes: a recovery system 10; a transmitter 12 for transmitting encoded data 18; and a receiver 14 for receiving a return signal 15 generated by the communication system 21 of wireless device 16. Base station 11 may include any system capable of transmitting encoded video signals, such as a videophone, a cellular device, a broadcasting system, a video server, a satellite system, etc.

In a normal course of activity, base station 11 causes encoded data 18 to be transmitted by transmitter 12 to wireless device 16, where the data is decoded and displayed. The video data may be of any format, e.g., a streaming video broadcast, a prerecorded program, multimedia data, etc. During the time video data is being received by wireless device 16, communication system 21 of wireless device 16 transmits a return signal 15 back to base station 11, which is received by receiver 14. Return signal 15 may comprise any type of signal that informs the base station of the signal condition between the wireless device 16 and the base station 11. For instance, wireless device 16 could repetitively transmit a code or sequence of bits that would continuously inform the base station of the state of the communication link. Alternatively, return signal 15 could comprise an error message that would be sent any time wireless device 16 failed to receive a signal from base station 11. In yet another case involving a continuous two-way video communication, the return signal 15 could comprise or be embedded in video data being transmitted back to base station 11.

Once received, the return signal 15 is passed to signal analysis system 22 of recovery system 10, which analyzes the return signal to determine if a loss condition exists between wireless device 16 and base station 11. A loss condition may be detected as a lost signal, a degraded signal, a fading condition, erroneously received data, etc. Signal analysis system 22 can make its determination based on any criteria, e.g., if the return signal power level falls below a predetermined threshold, if a return bit sequence is not received, etc. If a loss condition is detected for data being transmitted from wireless device 16 to base station 11, the present embodiment concludes that a loss condition also existed for data being transmitted from base station 11 to wireless device 16. Based on this determination, recovery control 28 can identify any frame or frames of data that were not received by wireless device 16.

As noted above, if a P frame of video data was lost during transmission to wireless device 16, then all subsequent P frames could not be decoded by wireless device 16, until a next I frame was received. All of these subsequent P frames would therefore have to be discarded by wireless device 16. Recovery system 10 alters the encoded data being sent in a manner described below to avoid such losses.

Specifically, if a loss condition is detected, the information is passed to recovery control 28. Recovery control 28 will then automatically replace a future (i.e., soon to be transmitted) P frame within encoded data 18 with an I frame. The future P frame that will be replaced may be determined by estimating the number of bits required to send the replacement frame and the amount of buffer space available at the decoder. This replacement ensures that an entire chain of P frames will not be lost. Recovery control 28 can be implemented with varying amounts of intelligence. For instance, recovery control can simply select the next available P frame to convert to an I frame any time a loss is detected. Alternatively, recovery control 28 could examine the current stream of frames to determine if such a replacement is worthwhile (e.g., if an I frame is about to be sent anyway, do not bother with the replacement step).

The process of converting a P frame to an I frame is handled by P to I converter 24. P to I converter 24 can be implemented in any manner known in the art, which will typically include a decoder 26 that facilitates the translation of P frames to I frames. The conversion process requires continuous normal decoding of the I and P frames. When a P frame is converted to an I frame, its dependence on the previous I or P frame is removed. The corresponding decoded frame is processed by applying the DCT and the appropriate VLC's. The key however is that the new I frame is not much different from the decoded P frame, so the decoder can recover the remaining frames without a large loss in quality. Although such a conversion can be a complex operation, the transmission of a converted I frame would only be required when wireless device 16 is known to be recovering from a loss condition.

It should be understood that the conversion process may be targeted at any or all layers within a video sequence that can be encoded, such as the base and enhancement layers defined by MPEG-2 and MPEG-4. Moreover, the invention and conversion process can be applied to video data encoded using a partial intra refresh method, where a predictive frame may not be clearly defined, but predictive elements may be used in parts of some or all the frames. In such a system, any frame that contains some predictive elements may be altered and coded without any predictive elements, which is an intra frame.

Referring now to FIG. 2, a second embodiment of a wireless communications system is shown. Similar to the embodiment depicted in FIG. 1, the embodiment shown in FIG. 2 includes a base station 30 having a transmitter 52 that transmits encoded video data to wireless device 16, and a receiver 54 for receiving a return signal 15 from wireless device 16. Transmitter 52, receiver 54, and wireless device 16 provide the same functionality as those described in FIG. 1. The embodiment of FIG. 2 is distinct however, in that the recovery system is distributed between the base station 30 and a network server 40.

In this case, video data 48 is: (1) encoded by an encoder 44 residing at network server 40; (2) forwarded over network 38 to base station 30; and transmitted by transmitter 52 to wireless device 16. Similar to the case described in FIG. 1, a loss condition can be received and identified by receiver 54 and signal analysis system 36. However, in the event of a loss condition, the information is forwarded to local control system 34, which forwards the information over network 38 to network server 40. Network control system 46 then utilizes the information and can cause a soon to be sent P frame to be replaced by an I frame at network server 40. Namely, P to I converter 42 will convert a P frame to an I frame, and the converted frame will then be inserted into the stream of frames being sent to the base station 30.

It is understood that the systems, functions, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which-when loaded in a computer system—is able to carry out these methods and functions.

Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A wireless video communication system, comprising:
   a transmitter for transmitting encoded video data to a wireless device;
   a receiver for receiving a return signal from the wireless device;
   a signal analysis system for analyzing the return signal to determine if a degraded signal condition exists between the transmitter and wireless device; and
   a recovery system that converts a predictive video frame in the encoded video data into an intra-coded video frame if the degraded signal condition exists.

2. The wireless video communication system of claim 1, wherein the encoded video data is encoded under an MPEG format, the predictive video frame comprises a P frame, and the intra-coded video frame comprises an I frame.

3. The wireless video communication system of claim 1, wherein the wireless device comprises a cellular device.

4. The wireless video communication system of claim 1, wherein the wireless device comprises a personal digital assistant.

5. The wireless video communication system of claim 1, wherein the wireless device comprises a video telephone.

6. The wireless video communication system of claim 1, wherein the degraded signal condition is determined to exist if a strength of the return signal fades below a predetermined threshold.

7. The wireless video communication system of claim 1, wherein the degraded signal condition is determined to exist if the return signal includes an error message from the wireless device.

8. The wireless video communication system of claim 1, wherein the recovery system includes an MPEG decoder.

9. The wireless video communication system of claim 1, wherein the recovery system is remotely accessible over a network.

10. A program product stored on a recordable medium, which when executed, provides a system for recovering encoded video data being transmitted from a base station to a wireless device, wherein the program product comprises:
    a system for analyzing a return signal from the wireless device to determine if a degraded signal condition exists between the base station and wireless device; and
    a system that converts a predictive video frame in the encoded video data into an intra-coded video frame if the degraded signal condition exists.

11. The program product of claim 10, wherein the encoded video data is encoded under an MPEG format, the predictive video frame comprises a P frame, and the intra-coded video frame comprises an I frame.

12. The program product of claim 10, wherein the degraded signal condition is determined to exist if a strength of the return signal fades below a predetermined threshold.

13. The program product of claim 10, wherein the degraded signal condition is determined to exist if the return signal includes an error message from the wireless device.

14. The program product of claim 10, wherein the system that converts includes an MPEG decoder.

15. A method of recovering lost video data in a wireless video communication system, comprising the steps of:
    transmitting encoded video data from a base station to a wireless device;
    receiving at the base station a return signal from the wireless device;
    analyzing the return signal to determine if a degraded signal condition exists between the base station and wireless device; and
    converting a predictive video frame in the encoded video data into an intra-coded video frame if the degraded signal condition exists.

16. The method of claim 15, wherein the converting step is done locally at the base station.

17. The method of claim 15, wherein the converting step is done remotely over a network.

18. The method of claim 15, wherein the degraded signal condition exists if a strength of the return signal fades below a predetermined threshold.

19. The method of claim 15, wherein the degraded signal condition exists if the return signal includes an error message.

20. A video recovery system for use when transmitting frames of encoded video from a first device to a second device, the system comprising:
    a signal analysis system at the first device for receiving a return signal from the second device and determining if a degraded signal condition exists between the first device and the second device; and
    a recovery system that transmits an intra-coded video frame in place of a video frame having predictive elements if the degraded signal condition exists.

21. The video recovery system of claim 20, further comprising a system that converts the video frame having predictive elements to the intra-coded video frame.

22. The video recovery system of claim 21, wherein the system that converts the video frame having predictive elements to the intra-coded video frame can operate on one or more individual layers.

23. The video recovery system of claim 20, wherein the video frame having predictive elements is encoded using a partial intra refresh method.

* * * * *